United States Patent [19]
Heinzman

[11] 3,965,394
[45] June 22, 1976

[54] APPARATUS FOR PROTECTING A MULTIPHASE POWER TRANSMISSION LINE FROM INTERMEMBRAL FAULTS

[75] Inventor: Homer W. Heinzman, Arlington, Tex.

[73] Assignee: LTV Aerospace Corporation, Dallas, Tex.

[22] Filed: May 19, 1975

[21] Appl. No.: 578,452

[52] U.S. Cl. .............................. 317/18 R; 317/27 R; 317/32
[51] Int. Cl.² .......................................... H02H 1/02
[58] Field of Search .......... 317/18, 27 R, 32, 36 TD, 317/49

[56] References Cited
UNITED STATES PATENTS

| | | | |
|---|---|---|---|
| 3,183,405 | 5/1965 | Sonnemann | 317/18 |
| 3,546,537 | 12/1970 | Jump et al. | 317/36 TD |

FOREIGN PATENTS OR APPLICATIONS

| | | | |
|---|---|---|---|
| 558,441 | 9/1932 | Germany | 317/27 |

Primary Examiner—J. D. Miller
Assistant Examiner—Harry Moose
Attorney, Agent, or Firm—James M. Cate

[57] ABSTRACT

Disclosed is an apparatus for protecting a three-phase power transmission line, having three power conductors, from intermembral electrical faults. First, second, and third sensing and rectifying means are inductively associated with respective ones of the three power conductors of the power transmission line for generating respective DC signals corresponding to the current flow through the respective, associated power conductors. A first switching means is provided for disconnecting the power transmission line from a power source upon the occurrence of a voltage imbalance between the sensing and rectifying means. Another switching means is provided for temporarily interconnecting the outputs of the sensing and rectifying means before operation of the first switching means, for preventing spurious tripping of the first switching means during sharp increases in power which do not occur as a result of a fault. In the preferred embodiment, the response time of the second switching means is shortened in the event of an increase in power involving a fault.

13 Claims, 3 Drawing Figures

APPARATUS FOR PROTECTING A MULTIPHASE POWER TRANSMISSION LINE FROM INTERMEMBRAL FAULTS

This invention relates to apparatus for protecting multiphase power transmission lines from damage caused by electrical faults between the respective conductors of a multiphase transmission line and, more particularly, to such an apparatus operable for interrupting three-phase power conducted through three, parallel, power conducting rails extending along the guideway of an electrically powered transportation system.

A number of systems have been developed for protecting power distribution systems from damage resulting from ground faults, wherein undesired current flow occurs between a power transmission conductor and an adjacent structure having an electrical potential lower than that of the power transmission conductor. An analogous malfunction, which is often more difficult to detect and rectify, may occur in power transmission lines having three power conductors for transmitting three-phase, alternating current. The latter difficulty is that of intermembral, inter-conductor faults permitting current flow between respective ones of the power conductors. In the embodiments of the present invention which will be considered in detail herein, the power conductors comprise power conductive rails, hereinafter "power rails," which extend along a vehicular guideway for providing three-phase power to guideway following vehicles which are propelled along the guideway by electric motors of various types. To permit sliding contact between such power rails and electrical brushes mounted on the vehicles, the power rails are necessarily uninsulated, having at least portions thereof exposed to the vehicle brushes. In such applications, it has been found desirable to orient the three power rails in a planar array, wherein the rails are mutually parallel and, in one embodiment, arrayed one above the other alongside the guideway; vertically oriented sets of brushes carried by the vehicles are positioned to contact and slide along the power rails. Such a system is shown, for example, in U.S. Pat. No. 3,762,515. In such transportation systems wherein the guideway is uncovered, i.e., not enclosed within a building or other structure, it has been found that rail-to-rail faults may occur when electrically conductive debris, such as foil backed paper, metal cans or the like, are blown by the wind into contact with two of the rails. Faults may also arise from vehicle malfunctions causing the collector brushes to bridge between rails, from malfunctions within the vehicle, or even from small animals contacting the rails. These faults typically occur between the center rail and one of the other two, and seldom occur between only the upper and lower rails. When an arc occurs some distance from a power soruce, the impedance of the two power rails involved can limit the current through the faulted rails to a magnitude less than the current required for operation of the vehicles. Such rail-to-rail faults, moreover, may cause heating and resulting fusing or deformation of the rails. Once begun, an arcing fault tends to persist, even though the object which initially caused the short is removed, because of the generation of an ionized, plasma bridge between the adjacent rails by the high power and resulting heat.

In the past, means for detecting and correcting such intermembral conditions have been of several types. One includes means for sensing the current flow through each of the power conductors and producing DC output signals whose voltages correspond, respectively, with the current levels on the rails. The current imbalance caused by a line-to-line fault thus results in an imbalance between the corresponding output voltages, which otherwise remain substantially equal. A factor which must be considered in the design of such circuits is their response to sudden changes in current level, in the power lines, which changes do not result from a fault. That is, if three-phase current is turned on, increased or decreased sharply, or turned off, the first phase cycle occurring after the sharp change will be of a substantially raised or lowered level with respect to the preceeding, average current level. One of the power conductors will thus receive an initial increase or decrease in current for a few milliseconds, depending upon the phase cycle frequency, before the other two conductors receive power, resulting in a momentary imbalance which may trip the protective circuit before an averaged, steady-state condition is reached. To accommodate such instantaneous unbalanced conditions, prior-art circuits have employed smoothing capacitors or the like for providing a smoothing time constant of several cycles during which instantaneous voltage output differences are ignored. If a fault exists, however, this delay in operation may result in arching damage to the rails during the initial period in which voltage differences are ignored.

It is, accordingly, a major object of the present invention to provide a new and improved apparatus for monitoring a three-conductor power transmisson line to detect faults which may exist between respective ones of the conductors and for protecting the power transmission line from damage resulting from such faults.

Another object is to provide such an apparatus having means for disconnecting the power transmission line from a power source upon the occurrence of a fault, but further having means preventing tripping of the circuit as a result of spurious transients or as a result of imbalances resulting during normal increases and decreases in the current.

A further object is to provide such an apparatus having multiple sensing and rectifying means operable to produce DC output signals proportional to current flow through respective ones of the power conductors of a power line and having means effective to interconnect the outputs of respective sensing and rectifying circuits during predetermined time periods following increases or decreases in current flow, whereby voltage levels at the outputs of the respective sensing and rectifying means are temporarily equalized.

Yet another object is to provides such an apparatus in which the response time of the means interconnecting the outputs of the sensing and rectifying means is shortened in the event of a fault.

Figure 1:
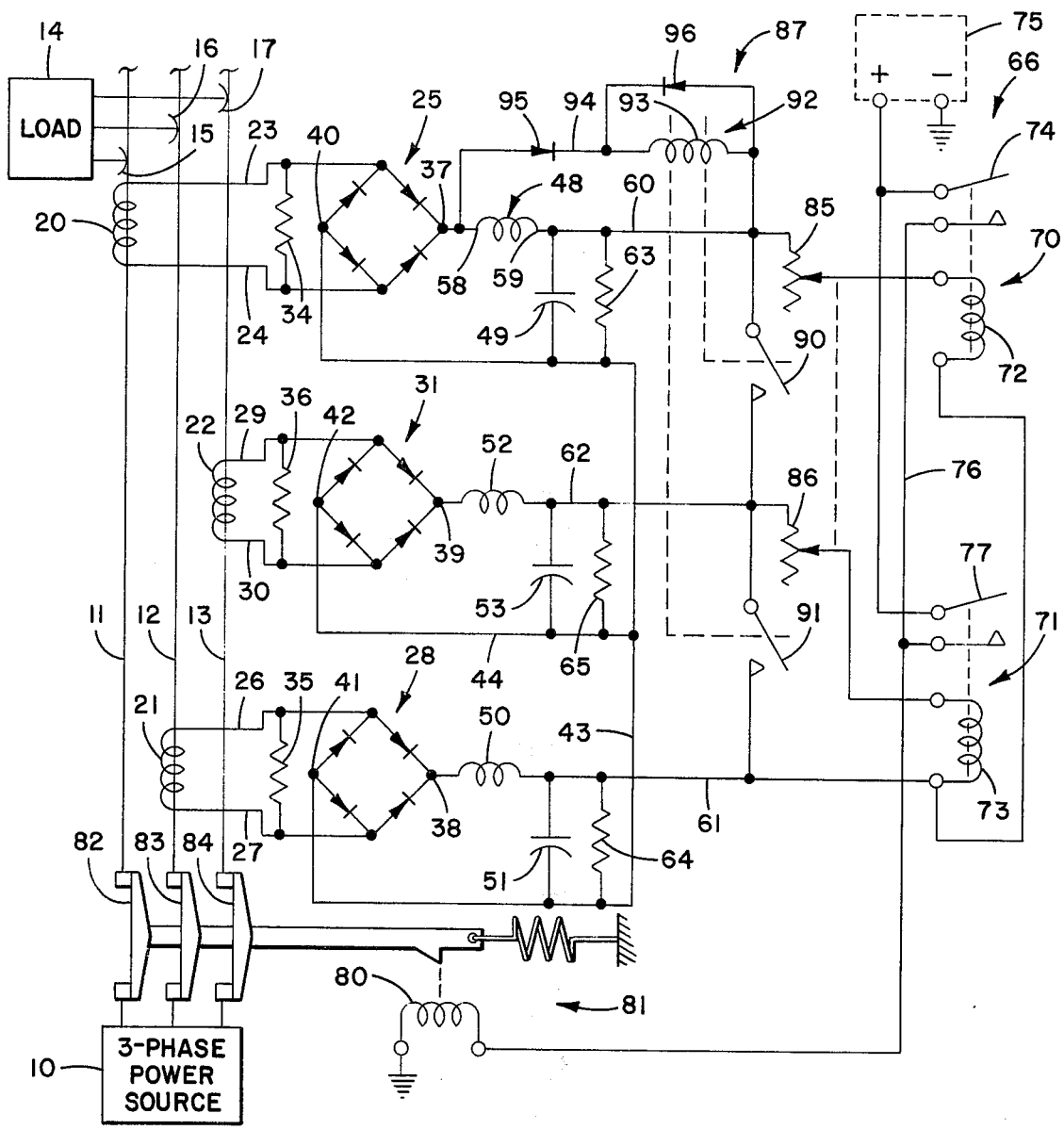
FIG. 1 is a schematic diagram of a circuit constructed according to a first embodiment of the present invention.

With reference now to FIG. 1, a three-phase AC power supply source 10 supplies power through first, second, and third power conductors 11, 12, and 13 to a load 14. In the application which will be described herein, the load 14 comprises an electrically powered vehicle, as has been discussed hereinabove, and the first, second, and third power conductors 11, 12, and 13 comprise first, second, and third power rails which are contacted by first, second, and third pickup contacts, e.g., brushes 15, 16, and 17, respectively, the contacts being carried by the vehicle for movably contacting the power rails by sliding or rolling against the rails. In the present embodiment, the second power rail 12 constitutes the center rail of three rails 11, 12, 13 disposed in vertical array. As has been discussed, rail-to-rail faults are most likely to occur between the center rail 12 and either one of the other two rails 11, 13 rather than between the uppermost and lowermost rails 11, and 13. Because the load 14, contacts 15, 16, 17, and power rails 11, 12, 13 do not constitute a part of the present invention, they are shown only schematically herein, and reference is again made to U.S. Pat. No. 3,762,515 in which such a system is illustrated and described. First, second, and third current transformers 20, 21, and 22 are inductively associated with the first, second, and third power rails 11, 12, and 13, respectively, for producing currents proportional to the phase currents passing through the respective power rails, according to practices known in the art. The current transformers 20, 21, and 22, in one embodiment, suitably have a 200/5 current ratio, e.g., one in which a 200 ampere current along an associated power rail results in a 5 ampere output current across the respective current transformer. According to practices known in the art, the current transformers 20, 21, and 22 physically encircle respective short lengths of power cable (not shown) which are electrically connected between adjacent, contiguous lengths of the respective power rails, whereby the current transformers do not interfere with the power contacts 15, 16, and 17 during passage of a vehicle 14 across the area adjacent the current transformers.

A first pair of input leads 23, 24 is connected serially between the first current transformer 20 and the input terminals of a first, full-wave rectifier bridge circuit 25, the bridge circuit being suitably of a 27 ampere, 400 peak inverse voltage capacity. Similarly, a second pair of leads 26, 27 is connected between the second current transfomer 21 and a second rectifier bridge circuit 28, and a third pair of leads 29, 30 is connected serially between the third current transformer 22 and a third bridge circuit 31. First, second, and third burden resistors 34, 35, and 36 are connected across the first, second, and third pairs of input leads 23, 24; 26, 27; and 29, 30, respectively, for preventing excessive voltage across the bridge circuits 25, 28, and 31, respectively. The bridge circuits 25, 28, and 31 have respective first output terminals 37, 38, and 39 and respective second output terminals 40, 41, and 42, the second output terminals being commonly interconnected by common lead 43 and lead 44, which interconnects the second output terminal 42 of the third bridge circuit 31 with the common lead 43.

The bridge circuits 25, 28, 31 are operable to rectify alternating currents received from the current transformers 20, 21, and 22 and produce respective pulsating DC output signals which are proportional in voltage level to the current levels received by the respective current transformers 20, 21, and 22. Accordingly, the first bridge circuit 25, in combination with its associated current transformer 20, input leads 23, and 24, and burden resistor 34, comprises a first sensing and rectifying means for producing a respective DC signal corresponding to the AC current present in the first power conductor 11. Similarly, the second bridge circuit 28, the second current transformer 21, and the second resistor 35, comprises a second sensing and rectifying means, and the third bridge circuit 31, in combination with the third current transformer 22 and the third burden resistor 36, comprises a third sensing and rectifying means.

First, second, and third LCR filtering circuits (48, 49, 63; 50, 51, 64; and 52, 53, 65, described below) are connected across the outputs of the first, second, and third bridge circuits 25, 28, and 31, respectively. The first LCR filtering circuit comprises a first filter inductor 48, a first filter capacitor 49, and a first leakage resistor 63, and the second LCR filtering circuit comprises a second filter inductor 50 a second filter capacitor 51, and a second leakage resistor 64, and the third LC filtering circuit comprises a third filter inductor 52 a third filter capacitor 53, and a third leakage resistor 65. With respect to the first filtering circuit 48, 49, 63 as typical, the first filter inductor 48 as a first terminal 58 which is connected to the first, non-common output terminal 37 of the first bridge circuit 25, and a second terminal 59 connected to a first output conductor 60. The second and third filter inductors 50, 52 are connected to corresponding, second and third output conductors 61, 62, respectively. The filter inductors 48, 50, and 52 are suitably of 5 ampere, 30 millihenry capacities, and the filter capacitors 49, 51, 53 have a value of approximately 1700 microfarads. Between the respective output leads 60, 61, and 62 and the associated common leads 43, 44 are connected the first, second, and third drainage resistors 63, 64, and 65, each suitably of a value of approximately 10 ohms.

A first, voltage responsive switching means 66 is provided for electrically isolating the power source 10 upon the occurrence of an intermembral, rail-to-rail fault, as discussed more fully hereinbelow. The first switching means comprises first and second voltage sensitive relays 70, 71 having respective relay coils 72, 73 respectively connected between the second and first output conductors 61, 60 and between the second and third output conductors 61, 62. The relays 70 and 71 are suitably of a 2.2 volt operating level and a 60 milliwatt sensitivity. The first relay 70 has a normally open switch element 74 connected between a positive output terminal of a DC power supply 75, in the present embodiment, and a common conductor 76, and the second relay 71 has a normally open switch element 77 also connected between the positive output of the power supply 75 and the common conductor 76. The negative output terminal of the power supply 75 is connected to ground in the present embodiment. The common conductor 76, in turn, is connected between the normally open switch elements 74, 77 and one side of a trip coil 80 of a circuit breaker 81 having first, second, and third switch contact elements 82, 83, and 84 connected in series between the three-phase power supply 10 and the first, second, and third power rails 11, 12, and 13, respectively. The circuit breaker 81 thus comprises a third element of the first voltage responsive switching means and is of a capacity sufficient for interrupting fault current between the power source 10 and a faulted section of the power rails 11, 12, 13. For example, the circuit breaker is suitably of the type manufactured by the Westinghouse Electric Corporation as Model SCB 600. The other side of the circuit breaker trip coil 80 is connected to ground (or to the other terminal of the power supply 75 if the power supply is not grounded), whereby, upon either of the normally open switch elements 74, 77 being closed, actuating power is conducted therethrough from the power supply 75 through common conductor 76 and circuit breaker coil 80 to ground, thereby actuating the circuit breaker 81 to release the trip mechanism, opening contact elements 82, 83, 84. Adjustment of the operating current for relays 70, 71 is provided by first and second rheostats 85, 86 (suitably 175 ohm, 12.5 watt capacity rheostats connected in tandem) electrically connected between the first relay 70 and the first output conductor 60 and between the second relay 71 and the third output conductor 62, respectively.

A second voltage responsive switching means 87 is provided having first and second, normally open switch elements 90, 91 serially connected between the first and third output conductors 60, 62 and between the second and third output conductors 61, 62, respectively. The normally open switch elements 90, 91, comprise parts of a two pole relay 92 having a coil 93 connected between the first output conductor 60 and a lead 94. A blocking diode 95, suitably an IN4003 diode, has its cathode connected to the lead 94 connected to the relay coil 93 and its anode connected to the first output terminal 37 of the first rectifier bridge 25, and a second, commutating diode 96 is connected between the lead 94 and output conductor 60 in parallel with the relay coil 93, the second diode having its cathode connected to lead 94.

In normal operation wherein no faults exist between the rails 11, 12, and 13, the phase currents carried by the respective rails 11, 12, and 13 are normally substantially equal in average magnitude. Three-phase power flows from the power source 10 through the rails in 120° seqeunce. As is known in the art, a fourth conductor, not shown, may also be employed as a grounded conductor. In the present example, it will be assumed that the first rail 11 carries the "A" phase, the second rail 12 the "B" phase, and the third rail 13 the "C" phase. The full-wave, bridge rectifiers 25, 28, and 31 produce respective potentials across their respective output terminals 37, 40; 38, 41; and 39, 42 which comprise pulsating DC signals whose voltages correspond to the currents flowing through the respective, associated rails. The LCR filtering circuits 48, 49, 63; 50, 51, 64; and 52, 53, 65 serve to smooth the pulsating DC output signals at the first output terminals 37, 38, 39 of the bridge circuits 25, 28, and 31, whereby the output signals applied to the output conductors 60, 61, and 62 comprise essentially steady DC voltages of respective values which correspond to the average AC phase currents present in the respective power rails 11, 12, and 13. The time constants of the LCR filtering circuits are of respective values which are sufficient to smooth out the instantaneous differences in voltages corresponding to the instantaneous differences in currents of substantially equal magnitude present in the respective power rails 11, 12, and 13 but in displaced phase relationship. For example, the time constant of the present LCR filtering circuits, wherein the inductors 48, 50, and 52 are of approximately 30 millihenrys, wherein the capacitors 49, 51, and 53 are 1700 microfarads, and wherein the resistors 63, 64, and 65 and 10 ohms, is approximatley two cycles. the time constant for the typical, first LCR filter circuit comprising inductor 48, capacitor 49, and resistor 63 may be computed by Laplace transformers by solving for the time constant of the voltage response across the inductor 48 following initiation of an AC current in the power rail 11, as represented by line B of FIG. 2. Only the values of L, R, and C are considered, because the combined resistance of rheostat 85, coil 72, inductor 48 and other circuit components in series with the inductor 48 is much higher than that of the leakage resistor 63, which is 10 ohms in the present embodiment. The time constant may be derived from Laplace transform $$F(S) = \frac{S^2 + \frac{1}{RC}S}{S^2 + \frac{1}{RC}S + \frac{1}{LC}} \quad (1)$$

wherein S is the Laplace operator, R is the resistance of the leakage resistor 63, C is the capacitance of the filter capacitor 49, and L is the inductance of inductor 48.

Rearranging equation (1):

$$F(S) = 1 - \frac{\frac{1}{LC}}{S^2 + \frac{1}{RC}S + \frac{1}{LC}} \quad (2)$$

For an equation of the form $1/S^2 + 2\alpha S + \beta^2$ the solution is:

$$f(t) = \frac{e^{-\alpha t}}{\sqrt{\beta^2 - \alpha^2}} \sin \sqrt{\beta^2 - \alpha^2} t \text{ for } \beta^2 > \alpha^2 \quad (3)$$

Substituting the values of the present circuit, wherein $R = 10$ ohms, $C = 1,700 \mu f = 1.7 \times 10^{-3}$ farads, and $L = 30$ milihenrys $= 30 \times 10^{-3}$ henrys, $1/LC = 1.9608(10^4) = 140^2$, and $1/RC = 58.8 = 2(29.4)$. Substituting these values in equation (2):

$$F(S) = 1 - \frac{1.96(10^4)}{S^2 + 2(29.4)S + (140)^2} \quad (4)$$

Then $$v(t) = \delta(t) - \frac{e^{-29.4t} \times 1.96(10^4)}{\sqrt{(140)^2 - (29.4)^2}} \sin \sqrt{140^2 - 29.4^2} t \quad (5)$$

Rearranging:

$$v(t) = \delta(t) - \frac{1.96(10^4)e^{-29.4t}}{137} \sin 137t \quad (6)$$

Rearranging:

$$v(t) = \delta(t) - 143e^{-29.4t} \sin 137t \quad 7$$

The time constant is 1/29.4 seconds, or about 34 milliseconds, which is the equivalent of about two AC cycles in the present embodiment in which 60Hz AC power is conducted through the power rails. The first function represents an initial transient of negligible value. The filtering circuits are thus of a time constant which is as short as possible commensurate with their function of smoothing the outputs of the bridge circuits to prevent tripping of the relay 170, 171 by pulses otherwise occurring during steady-state operation, and they are thus to be distinguished from the smoothing circuits employed in prior-art circuits wherein the time constants extend for several cycles for preventing tripping of the circuit during momentary imbalances during step increases in power through the power rails resulting from sudden energization of the line or during sudden demands of power by a load, which would otherwise trip the circuit undesirably. The operation of the second voltage responsive switching means 87 to prevent such spurious tripping of the present circuit is described hereinbelow. It has been found suitable for the above operation that the time constant be less than three AC cycles, and preferably equal to approximately two cycles.

In a normal steady-state condition, the DC output signals in the output conductors 60, 61 and 62 being approximately equal, the relays 72, and 73 are not actuated by any voltage differential between the first and second output conductors 60, 61 or between the third and second output conductors 62, 61, and the switch elements 82, 83, and 84 remain in their normally closed position. Now assume, however, that a fault occurs between the first and second rails 11, and 12, i.e., involving current phases A and B, wherein excess current flows between rails 11 and 12, and the currents in the first and second rails 11 and 12 thus become higher in magnitude than that in the third rail 13. This results in the output voltages of the bridge circuits 25, 28, and subsequently those of the conductors 60 and 61, being increased and becoming greater than those of the third bridge 31 and the third output conductor 62, respectively. Accordingly, the voltage differential present across the relay coil 72 remains insufficient to actuate the relay 70, but the voltage differential across the coil 73, of the second relay 71, becomes sufficient to actuate relay 71, resulting in closure of the switch element 77 whereby current is conducted from power source 75 through lead 76 to the circuit breaker 81, releasing the tripping mechanism to open switch elements 82, 83, and 84, and thus protecting the power rails 11, 12, and 13 from damage which would otherwise result from the short circuit. While the power source 75 has been described as a DC power source operable in combination with a DC trip relay or circuit breaker 81, an AC power source is substituted when used in conjunction with an AC relay, not shown. The polarity of the terminals of the power source 75 can be reversed, in the embodiment of FIG. 1, with no effect upon operation. Relay 70 is actuated in a similar manner in the case of a fault between the second and third power rails 12 and 13. While not required in the present application, a third relay could be additionally employed having its coil connected between the first and third output conductors 60, 62 for sensing faults between the first and third power rails 11, 13.

Figure 2:
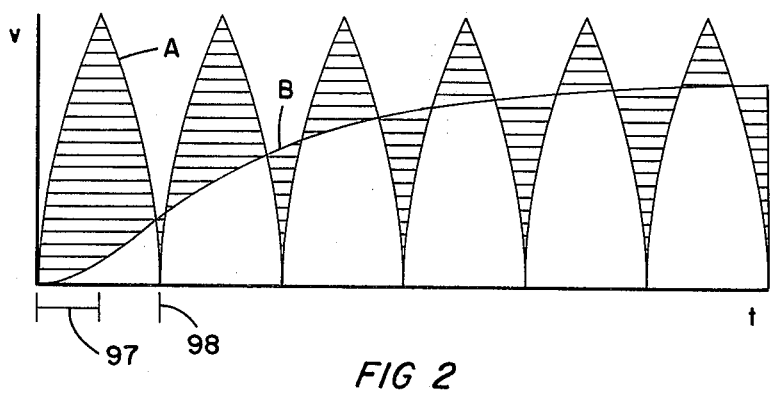
FIG. 2 is a graphical representation of the response of portions of the circuit of FIG. 1 during several cycles following initiation of current flow through the power rails.

While the circuit functions as thus far described are effective to protect the power rails 11, 12, 13 from damage in the event of a rail-to-rail fault of even relatively low magnitude, there remains the problem of undesired tripping during sharp or step increases in power which may occur, for example, when the circuit breaker 81 is initially closed by an operator to energize the power rails or as a result of a sudden increase in power consumption by the load 14. Such sharp increases in current flow through the rails result in momentary imbalances in the currents through the rails 11, 12, 13 which may be sufficient to operate relays 72 or 73 thereby tripping the circuit breaker 81, as will now be described. Referring to FIG. 2, line "A" represents the pulsating DC output signal across the output terminals of a respective one of the bridge circuits, which may be assumed to be bridge circuit 25 in the present example, the signal being proportional to the instantaneous current flow through the respective, associated rail, as has been discussed. This signal comprises a symmetrical, scallop form having two peaks per 1/60th second AC cycle, in that the bridge circuits comprise respective full-wave rectifiers. The filtered, smoothed DC output signal applied to the associated output conductor 60 immediately following closure of the switch elements 82, 83, 84 is represented by line "B". As is known in the art, the current peaks applied from a three-phase power source to respective ones of a three-conductor line (or to a respective power rail in the present embodiment) are applied in a phase sequence wherein the three successive positive peaks of current are separated by one-third of a cycle. The instantaneous, rectified DC output signals received from the respective bridge circuits 25, 28, and 31 include two peaks per cycle, corresponding to the positive and negative peaks of the non-rectified wave form. The first bridge output signal, represented by line "A" in FIG. 2, will therefore be followed by a second, identical signal form (not shown) across the output of the second bridge circuit 28, which will be delayed from the first signal by a third of a cycle. During the first one-quarter phase cycle following an initial application of three-phase power to the rails, as represented by the time period indicated at 97 in FIG. 2, the output signal present across the bridge circuit 28 will be delayed with respect to the signal represented in FIG. 2 by one-sixth cycles or about 2.78 milliseconds, whereby when the output level "A", as represented in FIG. 2, of the first bridge circuit 25 first approaches its peak value during the time period 97, the output voltage of bridge circuit 28 is approaching a zero level. Accordingly, the filter capacitor 49 of the first bridge circuit 25 is initially charged by the first peak, and its charging leads, by 45 degrees, that of the second capacitor 51, resulting in sufficient initial voltage difference between the output conductors 60 and 61 to actuate the relay 72 even though no fault exists. This voltage difference between the three output leads 60, 61, and 62 remains for the first few milliseconds of operation before the filtering circuits 48, 49, 63; 50, 51, 64; and 52, 53, 65 have stabilized the three output signals as their steady-state, filtered levels. The voltage rise between output lead 60 and common lead 43 following initiation of current flow through the power rail 11 is shown by wave form "B" of FIG. 2, and the steady-state filtered voltages at the three output leads 60, 61, 62 are approximately equal when the currents through the respective power rails 11, 12, and 13 are substantially equal in value.

The above-described difficulty could result in an inability to energize a section of the power rails 11, 12, 13 because of undesired tripping of the circuit breaker 81 during initial applications of power, or could result in repeated, undesired tripping of the circuit breaker during normal operating procedures when sudden increases in current usage occur. To alleviate such problems, the second voltage responsive switching means 87 is provided. During the short, initial time period of one quarter of an AC cycle, as represented by the time period 97 in FIG. 2, there is a large voltage differential across the inductor 48, as represented in the graph of FIG. 2 by the height of the shaded area above the smoothed, filtered voltage level (line B) at the output lead 60. This differential represents the voltage difference present across the inductor 48, the first terminal 58 thereof being of a higher potential than the second terminal 59. The blocking diode 95 is directioned to permit this positive potential to be applied across the relay coil 93, thus activating the fast acting relay 92 to close the switch elements 90 and 91. Because the relay 92 is of a sensitivity which results in its actuation before the relays 70, 71 and has a short response time, the second switching means 87 has a shoter response time than the first switching means 66, and the switch elements 90, 91 are thus closed before operation of the relays 70, 71 to trip the circuit breaker 81. The switch elements 90, 91 are thus effective to prevent the occurrence of a voltage differential between the output conductors 60, 61, or between the conductors 62, 61, during the initial period in which spurious tripping of the circuit breaker 81 may occur. Accordingly, undesired, spurious tripping of the circuit breaker 81 during step increase in power through the power rails 11, 12, 13 is prevented.

At the end of the first half cycle of current flow through the first rail 11, the output at terminal 37 of the first bridge circuit 25 will return to zero, as indicated by line "A" of FIG. 2 at point 98, at which time it is negative with respect to the filtered voltage present at conductor 60 (FIG. 1) represented by line B of FIG. 2. During the time period in which the voltage at the output of bridge 25 is negative with respect to the voltage at output conductor 60, the blocking diode 95 prevents reverse flow of current through the relay coil 93 which might deactivate the relay 92, and the commutation diode 96 permits sustained flow through the coil 93 sufficient to maintain the contacts 90, 91 in their closed condition. After a predetermined time period, preferably of less than one complete cycle and depending upon the time constant of the LCR filtering circuits, as has been discussed, the charge on capacitor 49 increases to a level at which the voltage drop across the inductor 48 is insufficient to continue activation of relay 92, whereby the switch elements 90, 91 are again permitted to open, at a time after the smoothed output signals at the respective output conductors 60, 61 and 62 have reached steady-state values at which they are substantially equal.

In summary, the second voltage responsive switching means 87, comprising the relay 92, with its switch elements 90 and 91, and the diodes 95 and 96, comprises a means for closing the normally open switch elements 90, 91, interconnecting the output leads 60, 61, 62, upon the occurrence of a predetermined voltage differential between one of the first output terminals (e.g., 37) of the sensing and rectifying means and one of the output conductors. The second voltage responsive switching means 87 has a response time which is shorter than that of the first voltage responsive switching means (which includes relays 70 and 71 and circuit breaker 81) whereby the output conductors 60, 61, and 62 are electrically interconnected during a step increase in power through the rails 11, 12, 13 before the first voltage responsive switching means 66 can be actuated to disconnect the power rails from the three-phase power source 10. During the time period in which the relay contacts 90, 91 are closed, the capacitors 49, 51 and 53 charge at a much faster rate than ordinarily because the relays 90, 91 interconnect all three output conductors 60, 61, and 62 thereby applying the output voltages of all three bridge circuits to all three capacitors 49, 51, and 53. This gives a resulting, very fast drop out time to the second voltage sensitive switching means 87. The charge upon the first filter capacitor 49 (as typical) increases rapidly, and the resulting voltage difference across the inductor 48 decreases rapidly. The response time of the second voltage responsive switching means is therefore less than the time constant of the LCR filtering circuits and is of the order of one cycle in the present embodiment. In the event of a fault, this response time is further increased because of the increased input current from the faulted rails. Therefore, if an actual fault exists simultaneously with the deactivation of the circuit during startup periods, the fault can be detected rapidly, before damage is done to the rails, because operation of the first voltage responsive switching means 66 is delayed for only about one current cycle, in contrast to prior-art systems in which protection from spurious tripping is provided by a smoothing capacitor which prevents operation of the tripout mechanism for several initial current cycles.

In the embodiment of FIG. 1, the second voltage responsive switching means 87 comprises a means responsive to a predetermined voltage differential across a respective one of the first, second, or third inductors 48, 50, or 52. The relay 92 is suitably connected across either the first, second, or third inductors 48, 50, or 52, in that an initial voltage drop will be present across each of the inductors during step increases in AC current. The scope of the invention is, of course, not limited to the specific embodiment of the drawing, and the second voltage responsive means 87 may thus be considered a means responsive to a predetermined voltage differential across at least one of the inductors 48, 50, 52. To improve the response time of the second voltage responsive switching means, ensuring operation of the second voltage responsive switching means at the earliest possible time following a sharp increase in AC power whereby the circuit breaker 10 is not tripped as a result of normal, step increases in power, additional relay circuits, not shown, corresponding to the relay 92 and its associated diodes 95, 96 may be connected across one or both of the other inductors 50, 52, additional associated switch elements, not shown, corresponding to switch elements 91, 90 being then connected between output leads 60, 61, and 62 in parallel with switch elements 90, 91, whereby the first of the inductors 48, 50, 52 to receive a predetermined voltage differential thereacross actuates a corresponding relay to interconnect the output conductors 60, 61, 62.

Figure 3:
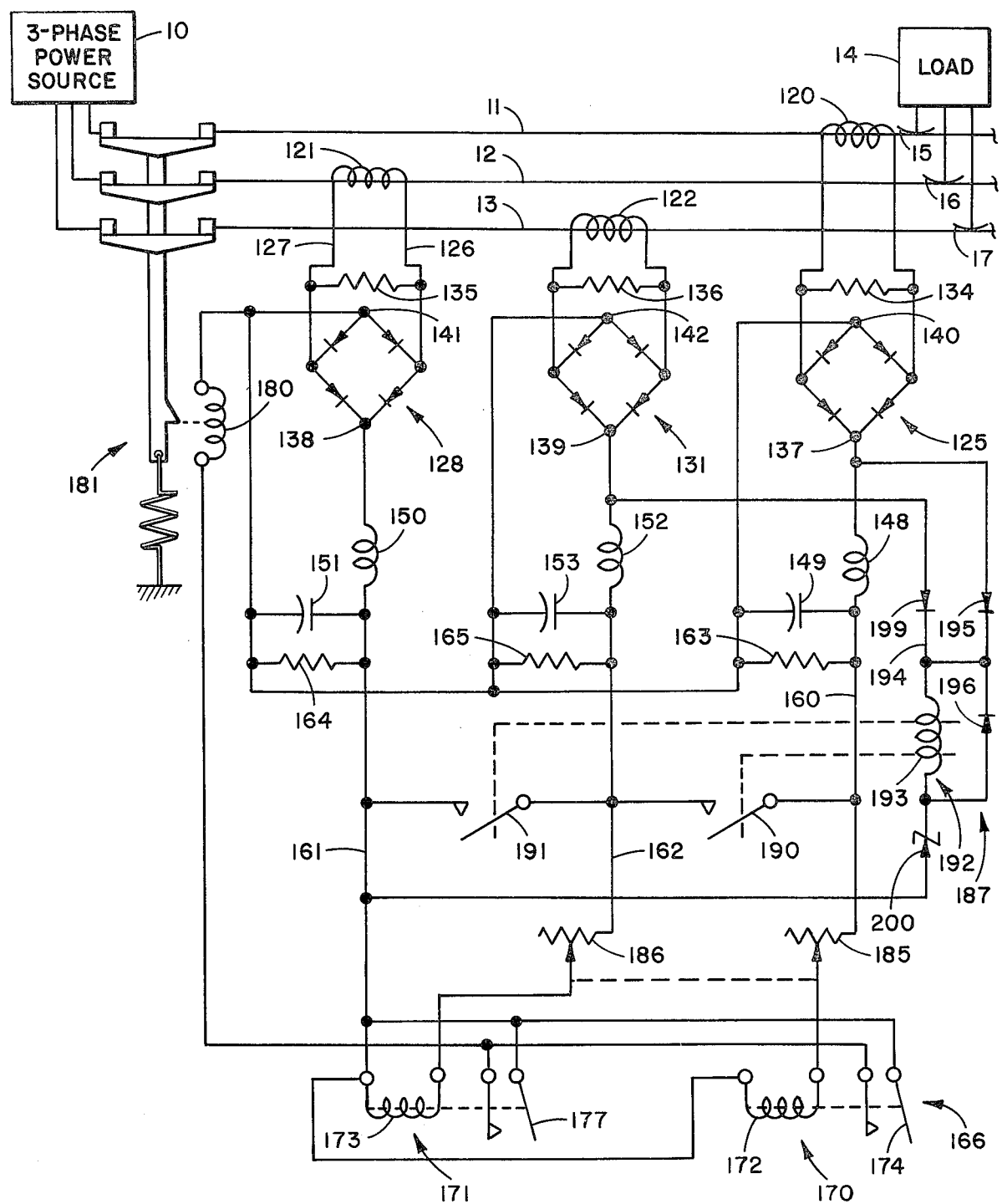
FIG. 3 is a schematic diagram of a circuit constructed according to a second embodiment.

A more desirable solution, however, is that of the embodiment of FIG. 3. In the circuit of FIG. 3, circuit components corresponding to respective components in the embodiment of FIG. 1 have been identified by numerals equal to 100 plus the numeral employed with respect to the corresponding component in the embodiment of FIG. 1. As will be understood from the description to follow, the embodiment of FIG. 3 is operable to quickly actuate the second voltage responsive switching means 187 to prevent spurious tripping of the circuit breaker 181, but does not require the use of more than one double throw relay. First, second, and third current transformers 120, 121, 122, bridge cicuits 125, 128, 131, and LCR filter circuits 148, 149, 163;

150, 151, 164; and 152, 153, 165 correspond to the first, second, and third current transformers 20, 21, 22, bridge circuits 25, 28, 31, and LCR filter circuits 48, 49, 63; 50, 51, 64; and 52, 53, 65, respectively. A second voltage responsive switching means 187 corresponds to the second voltage responsive switching means 87 of the embodiment of FIG. 1 with the exception that its relay coil 193 is connected between the second output conductor 161 and, through first and second parallel blocking diodes 195, 199, the first output terminals 137, 139 of the first and third bridge circuits 125, 131, respectively.

In the present embodiment, the relay coil 193 is connected to the second output conductor 161 through a zener diode 200, the anode of the zener diode being connected to the second output conductor 161, whereby, during steady-state operation, voltage potentials at the first output terminals 137, 139 of the first and third bridges 125, 131 which potentials exceed the averaged voltage level present at the second output conductor 161 by amounts less than the breakdown voltage of the zener diode 200 are blocked by the zener diode and prevented from keeping the double-pole relay 193 actuated. With reference to FIG. 2, such excess potentials are indicated by the shaded area above line B, and the zener diode 200 has a breakdown voltage slightly greater than these peaks of potential during the steady-state condition represented at the right side of the graph. The zener diode 200 may also be employed, for the same purpose, in the embodiment of FIG. 1, wherein it is connected between the double-pole relay 93 and the first output conductor 60.

In operation, the blocking diodes 195 and 199 are effective to apply to the relay coil 193 the highest of the potentials present at the bridge output terminals 137 and 139. At the instant the circuit is energized, any one of the three phases may in the zero crossing portion of the cycle. COnnecting the coil 193 to only the first and third bridge circuits 125, 131 is sufficient, in the present application, in that substantial output voltage will be present across at least one of the bridge circuits 125, 131 at any given time because the bridges 125, 131 comprise full wave rectifiers. (In the case of single phase rectifiers, not shown, some improvement in response time of the second voltage sensitive switching means 187 would be gained by also connecting the relay coil 193 to the output of the rectifier associated with the second power rail 12.)

After a few milliseconds of normal current flow through the power rails, the filtered output voltage applied to the second output conductor 161 through the filter network comprising elements 150, 151, 164 increases to a level which deactivates the two-pole relay 192, permitting switch elements 190 and 191 to open, the filtered voltage levels at the respective output conductors 160, 161, 162 having by this time reached substantially equal levels. Actuation of the first or second relays 170, 171 is thus prevented. The two-pole relay 192 is advantageously connected, through the zener diode 200, to the second output conductor 161, because in the event of a fault, the center rail 12 has a current flow which is at least as great as, and probably greater than, that in the other two rails. This is because, as has been discussed above, a fault between any of the rails will in all probability involve the center rail and usually will involve only one of the other two. When fault current is present in the center rail 12, the total current flow through the rail 12 is increased, whereby the output of the second bridge circuit 128 is increased, building up the filtered potential in the second output conductor 161 at a faster than normal rate whereby the voltage differential across the two-pole relay 192 is reduced at a faster than normal rate, thus quickly deactivating the two-pole relay 192 and permitting opening of the switch elements 190, 191 to permit rapid tripping of the circuit breaker 181 by one of the first or second relays 170, 171 of the first voltage responsive switching means 166. Thus, the response time of the circuit of FIG. 3 to trip the circuit breaker 181 in the event of a fault is shortened relative to that of the circuit of FIG. 1, and its response time with respect to activation of the double-pole relay 192 to prevent spurious tripping of the first voltage responsive switching means 166 is also shortened because of the connection of the relay coil 193 to both the first and third bridge circuits 125 and 131.

Another modification employed in the circuit of FIG. 3 is the use of power derived from power rail 12 to actuate the circuit breaker 81 rather than power from an independent power source such as the power supply 75 of FIG. 1. This modification eliminates the possibility of loss of protection resulting from a failure of the independent power source. Power can be derived from any of the rails. However, the center rail 12 is preferred because it is involved in substantially all fault conditions, as has been discussed, and because adequate energy is derived by the current transformer 121 from the increased current in the faulted rail 12. The circuit breaker may also comprise a circuit breaker actuated by alternating current. Referring to FIG. 1, AC current for tripping the circuit breaker 81 can be obtained directly from the second current transformer 21 by connecting the switch elements 74, 77 to the first lead 26 from the current transformer 21 instead of to the positive terminal of the power supply 75, and by connecting the second lead 27 to ground. Direct current for actuating the circuit breaker 81 can also be derived from fault current in the second power rail 12 by connecting the switch elements 74, 77 to receive rectified output voltage from either output terminal 38 of bridge circuit 28 or from the second output conductor 61 and by connecting the now grounded terminal of circuit breaker coil 81 instead to the second output terminal 41 of the second bridge circuit 28.

As will be understood by those in the art from the present specification, other circuit components may be substituted for the components described herein, the specific description of the components being provided only by way of illustration. For example, solid-state switching circuits may be substituted for the relays 70 and 71 if space is at a premium.

It will now be apparent that the circuit of the present invention is reliably effective to protect the power rails 11, 12, 13 from damage caused by electrical faults therebetween by disconnecting the AC power source from the rails upon the occurrence of a fault. The circuit additionally includes means for preventing spurious tripping in the event of sharp increases in power through the rails which are not associated with a fault, the response time of the latter means being shortened in the event of a fault, in the preferred embodiment, whereby the circuit is operable to disconnect the power source within only a few milliseconds in the event of a fault.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. For a three-phase power transmission system having a power source for supplying three-phase, alternating current to a load through a power transmission line having first, second, and third power conductors, apparatus for interrupting current flow through the transmission line upon the occurrence of an electrical fault permitting current flow between two of the power conductors, the apparatus comprising:

first, second, and third sensing and rectifying means, each having first and second output terminals, for producing respective DC signals corresponding to the AC currents present in the first, second, and third power conductors, respectively, the respective second output terminals of the sensing and rectifying means being interconnected;

first, second, and third filtering circuits connected between the output terminals of the first, second, and third sensing and rectifying means, respectively, the filtering circuits having respective inductors having respective first terminals connected to the first output terminals of the first, second, and third sensing and rectifying means, respectively, and having respective second terminals, first, second, and third output conductors being provided connected to the second terminals of the inductor of the first, second, and third filtering circuits, respectively;

a first voltage responsive switching means for electrically isolating the power source from the power transmission line upon the occurrence of a predetermined voltage differential between the second and first output conductors and, alternatively, between the second and third output conductors;

a second voltage responsive switching means, including two normally open switch elements each connected between one of the output conductors and a respective one of the other output conductors, the second voltage responsive swtching means comprising means temporarily closing the normally open switch elements upon the occurrence of a predetermined voltage differential between one of the first output terminals of the sensing and rectifying means and one of the output conductors, the second voltage responsive switching means comprising a means having a response time, in closing the normally open switch elements, which is shorter than that of the first voltage responsive switching means.

2. The apparatus of claim 1, the second voltage responsive switching means comprising means responsive to a predetermined voltage differential across a respective one of the inductors.

3. The apparatus of claim 1, the second voltage responsive switching means comprising means responsive to a predetermined voltage differential across at least one of the inductors.

4. The apparatus of claim 1, the second voltage responsive switching means comprising means responsive to a predetermined voltage differential between one of the output conductors and the first output terminal of one of the sensing and rectifying means connected to the other two output conductors.

5. The apparatus of claim 1, the second voltage responsive switching means comprising means responsive to a predetermined voltage differential between the second output conductor and the first output terminal of the respective one of the first and third sensing and rectifying means having the highest potential which potential is greater than that of the second output conductor.

6. The apparatus of claim 1, the second voltage responsive switching means comprising means responsive to a predetermined voltage differential between one of the output conductors and the first output terminal of the respective one of the sensing and rectifying means connected to the other two output conductors and having the highest potential of the other two output conductors.

7. The apparatus of claim 1, the second voltage responsive switching means comprising means having a response time in closing and subsequently opening the normally open switch elements which is shorter than three AC cycles.

8. The apparatus of claim 1, the first, second, and third filtering circuits having respective time constants shorter than three AC cycles.

9. The apparatus of claim 1, the first, second, and third filtering circuits having respective time constants of durations equal to approximately two AC cycles.

10. The apparatus of claim 1, the first switching means including a first, normally open switch element connected between the second and first output conductors and a second, normally open switch element connected between the second and third output conductors.

11. The apparatus of claim 10, the first switching means further comprising a circuit breaker having normally closed switch elements connected between the power source and the power transmission line, the first and second elements of the first switching means comprising means for actuating the circuit breaker to isolate the power source upon closure of any of the switch elements of the first switching means.

12. The apparatus of claim 10, the circuit breaker comprising means actuable by current received from the output terminals of at least one of the sensing and rectifying means.

13. For a three-phase power transmission system having a power source for supplying three-phase, alternating current to a load through a power transmission line having first, second, and third power conductors, apparatus for interrupting current flow through the transmission line upon the occurrence of an electrical fault permitting current flow between two of the power conductors, the apparatus comprising:

circuit means, associated with the power conductors and having first, second, and third output conductors, for producing respective DC signals in the first, second, and third output conductors which correspond to current flow through the first, second, and third power conductors, respectively;

a voltage responsive switching means for electrically isolating the power source from the power transmission line upon the occurrence of a predetermined voltage differential between two of the output conductors; and means for temporarily interconnecting the output conductors upon the occurrence of a change in current flow through one of the power rails relative to the current flow through another of the power rails, the means for temporarily interconnecting the output conductors having a response time shorter than that of the voltage responsive switching means.

* * * * *